(12) United States Patent
Lebeau et al.

(10) Patent No.: US 6,443,459 B2
(45) Date of Patent: Sep. 3, 2002

(54) SEALING ARRANGEMENT BETWEEN TWO COMPONENTS ROTATING RELATIVE TO ONE ANOTHER

(75) Inventors: Francis Lebeau, Westerlo (BE); Reinhard Wenzel, Krefeld (DE)

(73) Assignees: Voith Sulzer Papiertechnik Patent GmbH, Heidenheim (DE); Furon Seals N.V., Kontich (BE)

( * ) Notice: Subject to any disclaimer, the term of this patent is extended or adjusted under 35 U.S.C. 154(b) by 103 days.

(21) Appl. No.: 09/752,689

(22) Filed: Jan. 3, 2001

(30) Foreign Application Priority Data

Jan. 8, 2000 (DE) .......................................... 100 00 541

(51) Int. Cl.[7] ................................................. F16J 15/34
(52) U.S. Cl. ........................ 277/372; 277/395; 277/402; 277/549
(58) Field of Search ................................ 277/372, 373, 277/395, 402, 445, 549, 551, 579, 580, 581

(56) References Cited

U.S. PATENT DOCUMENTS 3,652,183 A * 3/1972 Pottharst, Jr.
6,186,510 B1 * 2/2001 Reagan
2001/0038179 A1 * 11/2001 Ikeda et al.

FOREIGN PATENT DOCUMENTS

| DE | 858371 | 12/1952 |
|---|---|---|
| DE | 1098305 | 1/1961 |
| DE | 1183399 | 12/1964 |
| DE | 4437668 | 5/1996 |
| DE | 19809303 | 9/1999 |

* cited by examiner

*Primary Examiner*—Robert J. Sandy
*Assistant Examiner*—Karlena D. Schwing
(74) *Attorney, Agent, or Firm*—Greenblum & Bernstein, P.L.C.

(57) ABSTRACT

Sealing arrangement between relatively rotatable components that includes a first component having a cylindrical circumferential surface on one of an interior and exterior circumference, and a second component having a ring groove open toward the circumferential surface. A ring-shaped carrier is arranged to be displaceable in the ring groove, a centering rod is arranged to guide the ring-shaped carrier on the circumferential surface, and a radial lip seal is arranged to rest against the circumferential surface in an elastic manner. An axial seal is arranged to rest against a side wall of the ring groove, and an anti-twisting device is coupled to the ring-shaped carrier and arranged to enable a limited range of motion in all directions of a radial plane.

23 Claims, 1 Drawing Sheet

SEALING ARRANGEMENT BETWEEN TWO COMPONENTS ROTATING RELATIVE TO ONE ANOTHER

CROSS-REFERENCE TO RELATED APPLICATIONS

The present application claims priority under 35 U.S.C. § 119 of German Patent Application No. 100 00 541.1, filed on Jan. 8, 2000, the disclosure of which is expressly incorporated by reference herein in its entirety.

BACKGROUND OF THE INVENTION

1. Field of the invention

The invention relates to a sealing arrangement between two components rotating relative to one another. The first component has a cylindrical circumferential surface on its inner or outer circumference and the second component has a ring groove open to the circumferential surface. A ring-shaped carrier is displaceable in the ring groove, and is guided on the circumferential surface by a centering rod. The carrier includes a radial lip seal whose lips rest against the circumferential surface in an elastic manner, and carries an axial seal that rests against a side wall of the ring groove.

2. Discussion of Background Information

Such a sealing arrangement is known, e.g., from DE 198 09 303 A1. Due to the displaceable nature of the carrier in the ring groove and the elastic effect of the radial lip, a seal is still guaranteed even when the axes of the two components are displaced radially opposite one another or are warped and run toward one another.

SUMMARY OF THE INVENTION

The present invention provides a sealing arrangement of the type mentioned at the outset, which has a more suitable for sealing against higher oil pressures.

Accordingly, the instant invention includes an anti-twisting device for the carrier that allows a limited range of movement in all directions of the radial plane.

This anti-twisting device allows the radial sealing lips to press against the circumferential surface with greater force, whether by oil pressure or constructive measures, without the danger that the ring-shaped carrier and the ring groove will rotate relative to one another. Nonetheless, the free movement between the carrier and ring groove, as it is necessary to maintain the sealing effect in the case of components being displaced relative to one another, is substantially guaranteed.

It is favorable for the anti-twisting device to be formed by stops that jut or extend laterally from the carrier and protrude into a recess provided in the side wall of the ring groove that has a larger cross-sectional surface than the stops. This leads to a space-saving construction.

Preferably, the stops have a circular shape and protrude into circular recesses. This leads to an even range of movement in all directions of the radial plane. When the stop is resting against the side wall of the recesses, a line contact occurs that prevents interlocking or the like.

The size of the diameter conforms to the current purpose of application and the size of the diameter to be sealed. Here, it has been shown to be suitable for the diameter of the recesses to be about 2.5 to 3 times the diameter of the stops.

A preferred construction includes stops being formed by the heads of screws that are axially screwed into the carrier. Such screws can be easily introduced in assembly. They can also serve to connect the carrier to other components.

Thus, it is favorable for the screws to hold the radial sealing lips firmly on the carrier. Therefore, relative movement between the carrier and the radial sealing lips is eliminated.

Instead of or in addition to this, it can be advantageous to provide for the screws to affix one of the support ring disks supporting the radial sealing lip securely to the carrier. Such a supporting ring disk prevents the radial lip seal from being pressed out at higher pressures to be sealed.

In a further embodiment of the invention, it is ensured that the one side wall of the ring groove is formed by an anti-twisting ring disk having recesses embodied as holes that is centered on the ring disk base and is fixed on the second component by axial screws and a covering ring disk. This leads to a very simple production of the recesses. Mounting is uncomplicated as well.

Moreover, it is favorable for the radial lip of the radial lip seal to be loaded by a spring in the direction of the circumferential surface. In this manner, the pressing force of the radial lip can be increased, which is desirable in many cases and is also permissible because of the anti-twisting device claimed.

Preferably, the spring is a ring-shaped leaf spring that is U-shaped in its cross-section. This spring can adapt well to the radial lip.

It is especially preferred for the one component to include a rotationally secured axis and for the other component to include the jacket of a sag compensation roll hydraulically supported thereon. The inner chamber of the jacket of such a sag (deflection) compensation roll contains oil and must be sealed over a relatively large diameter. Furthermore, the axis sags in a vertical or horizontal direction depending on its purpose of use. Nonetheless, the seal is maintained to its full extent.

The instant invention is directed to a sealing arrangement between relatively rotatable components. The arrangement includes a first component having a cylindrical circumferential surface on one of an interior and exterior circumference, and a second component having a ring groove open toward the circumferential surface. A ring-shaped carrier is arranged to be displaceable in the ring groove, a centering rod is arranged to guide the ring-shaped carrier on the circumferential surface, and a radial lip seal is arranged to rest against the circumferential surface in an elastic manner An axial seal is arranged to rest against a side wall of the ring groove, and an anti-twisting device is coupled to the ring-shaped carrier and arranged to enable a limited range of motion in all directions of a radial plane.

In accordance with a feature of the instant invention, the anti-twisting device may include a ring disk with recesses and stops arranged to jut laterally from the carrier and to protrude into the recesses. The recesses may have a larger cross sectional area than that of the stops. Further, the stops and the recesses may have circular shapes. A diameter of the recesses may be about 2.5–3 times a diameter of the stops. Moreover, the stops may include heads of bolts which are axially inserted into the ring-shaped carrier. The bolts may be arranged to hold the radial lip seal against the carrier. Still further, a circular support disk can support the radial lip seal and may be fixedly coupled to the carrier via the bolts. The anti-twisting device may include an anti-twisting ring disk which includes the recesses, and the anti-twisting ring disk can be located concentrically within the ring groove. The anti-twisting device may further include a circular covering disk arranged to coupled the anti-twisting ring disk to the second component via axial screws.

In accordance with another feature of the present invention, a radial lip of the radial lip seal can be loaded by a spring in a direction of the circumferential surface. The spring may include a circular plate spring having a U-shaped cross section.

According to still another feature of the invention, one of the first and the second component may have a rotationally fixed axis and the other of the first and the second component may support a jacket of a sagging compensation roll. The sagging compensation roll can be hydraulically supported on the other component.

The present invention is directed to an apparatus for providing a seal between relatively rotatable components. The apparatus includes a first component having a cylindrical circumferential surface on one of an interior and exterior circumference, and a second component having a ring groove open toward the circumferential surface. A ring-shaped carrier is arranged to be displaceable in the ring groove, a radial lip seal is arranged to rest against the circumferential surface in an elastic manner, and an anti-twisting device is coupled to the ring-shaped carrier and arranged to enable a limited range of motion in all directions of a radial plane.

In accordance with yet another feature of the present invention, the anti-twist device may be coupled to the ring groove and can include an anti-twist ring disk having recesses. Stop devices may be arranged to extend from the ring-shaped carrier and into the recesses. The radial lip seal can be coupled to the ring-shaped carrier by bolts, and heads of the bolt may form the stop devices. A supporting ring disk can be arranged to support the radial lip seal, and may be located between the radial lip seal and the anti-twist ring disk. The bolt heads can extend from the supporting ring disk. The recesses may have a greater cross sectional area than the stop devices. An axial seal can be arranged between the ring groove and the ring-shaped carrier. A centering rod may be arranged to guide the ring-shaped carrier on the circumferential surface.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
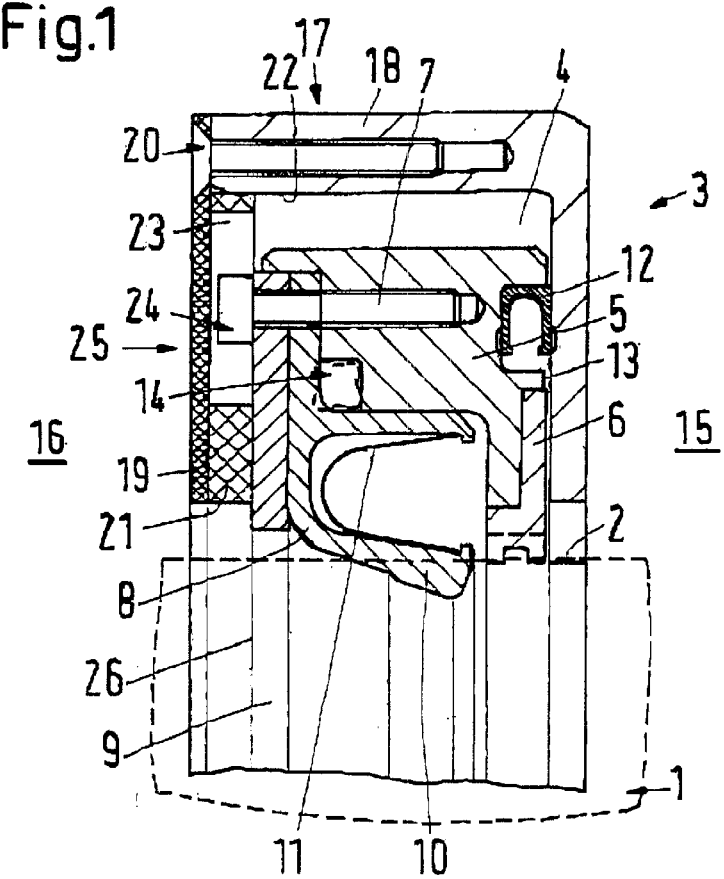
FIG. 1 illustrates a partial cross-section of a sealing arrangement according to the invention.

In FIG. 1, a first component 1 with a cylindrical circumferential surface 2 is shown in dashed lines. A second component 3 has a ring groove 4 in which a carrier 5 can be mounted. Carrier 5 has a limited axial play in ring groove 4 and is supported on circumferential surface 2 by way of a centering rod 6. With the aid of a number of screws 7, a radial lip seal 8 and a supporting ring disk 9 are attached to carrier 5. Supporting ring disk 9 prevents a deformation of radial lip seal 8 under the influence of the fluid to be sealed. Thus, radial lip seal 8 is protected against wear. Radial lip seal 8 includes, e.g., PTFE and has a radial lip 10 that, in its built-in state, is pressed radially outwardly and, under the influence of its own elasticity and the force of a bent leaf spring 11, rests against circumferential surface 2. In the side wall of carrier 5, an axial seal 12 is arranged that rests against side wall 13 of ring groove 4. Moreover, there is another static seal 14 that blocks the dividing line between carrier 5 and radial lip seal 8. In this manner, a seal is achieved between space 15 (shown to the right of the sealing arrangement in the drawing) and space 16 (shown to the left of the sealing arrangement in the drawing).

Figure 2:
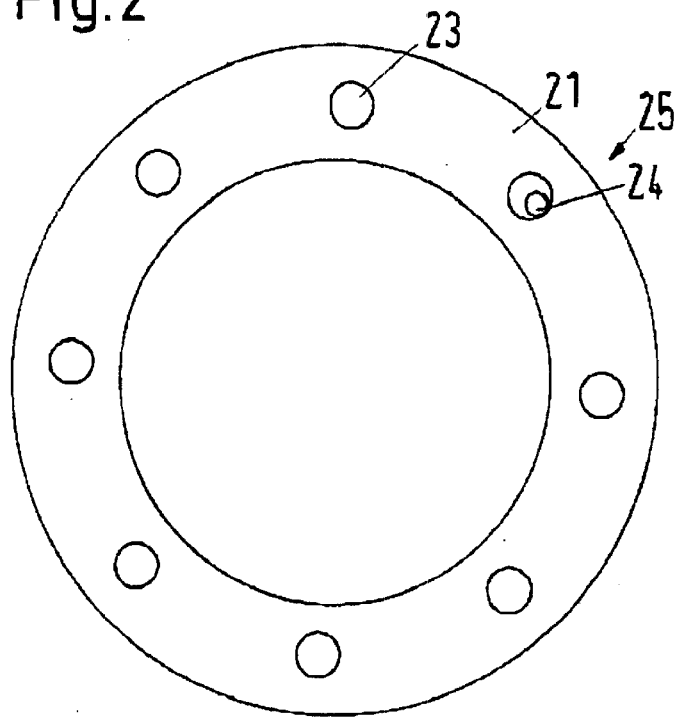
FIG. 2 illustrates a front view of an anti-twisting ring disk.

Ring groove 4 is located in a multi-part housing 17 that is built into the rest of second component 3 as an element of this component. An enveloping body 18, which has an L-shaped cross-section, is provided with a covering ring disk 19 on its face that is attached to the enveloping body 18 with the aid of a number of screws 20. Between covering ring disk 19 and supporting ring disk 9, an anti-twisting ring disk 21 is located, which is guided with its circumference on groove base 22 of ring groove 4 and is connected by adhesive or the like to covering ring disk 19 and thus secured against twisting, Recesses 23, embodied or formed as circular holes, are located in anti-twisting ring disk 21. Recesses 23, along with a circular stop 24, e.g., in the form of the head of screw 7, form anti-twisting device 25 that allows a limited range of movement in all directions of the radial plane. Here, the face of anti-twisting disk 21 shown to the right in FIG. 1 forms the other side wall 26 of ring groove 4. As depicted in FIG. 2, eight recesses 23 and stops 24 can be provided in anti-twisting disk 21, and, depending on the size of the sealing arrangement, other numbers may be considered as well.

FIG. 2 shows a recess 23 into which a stop 24 is located, so that certain movement in all directions of the radial plane is enabled, but that such movement is limited to a certain range of movement. While not shown, a stop 24 is also located in the other recesses 23.

When component 1 is the rotationally secured axis of a sag compensation roll and component 3 includes the rotating roll jacket and its face walls that close off its inner chamber, quite considerable sagging of the axis can occur during operation with the result that the center lines of both components no longer coincide. Since carrier 5, along with the parts attached thereto, has a certain axial play in ring groove 4, carrier 5 can perform a tipping movement within the boundaries of the range of movement allowed by anti-twisting device 25 that leaves radial sealing lip 10 fairly unchanged on circumferential surface 2. Here, the direction in which the sagging of the roll occurs is irrelevant because the anti-twisting device allows tipping in any direction.

In the above, it was assumed that component 1 is rotationally secured and component 3 is rotating. However, it can also be the case that component 1 is turning and component 3 is embodied or formed as fixed to the machine. Thus, both components 1 and 2 can rotate, but with a different speed or rotational direction. The embodiment shows a radial sealing lip 10 that acts radially inwards.

Moreover, it is also possible to achieve an arrangement in which circumferential surface 2 is embodied or formed on an inner circumference and radial sealing lip 10 acts radially outwardly. As a material for the radial sealing lip 10, not only PTFE comes into consideration, but also rubber or another elastic material.

As shown in FIG. 1, axial seal 12 can preferably be an axial lip seal whose lips rest against the side wall of the ring groove in an elastic manner, but can also be differently embodied in many cases, e.g, as an O-ring seal.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A sealing arrangement between relatively rotatable components, comprising:
   a first component comprising a cylindrical circumferential surface on one of an interior and exterior circumference;
   a second component comprising a ring groove open toward said circumferential surface;
   a ring-shaped carrier being arranged to be displaceable in said ring groove;
   a centering rod arranged to guide said ring-shaped carrier on said circumferential surface;
   a radial lip seal arranged to rest against said circumferential surface in an elastic manner;
   an axial sea arranged to rest against a side wall of said ring groove; and
   an anti-twisting device coupled to said ring-shaped carrier and arranged to enable a limited range of motion in all directions of a radial plane.

2. The arrangement in accordance with claim 1, wherein said anti-twisting device comprises a ring disk with recesses and stops arranged to jut laterally from said carrier and to protrude into said recesses.

3. The arrangement in accordance with claim 2, wherein said recesses have a larger cross sectional area than that of said stops.

4. The arrangement in accordance with claim 2, wherein said stops and said recesses have circular shapes.

5. The arrangement in accordance with claim 4, wherein a diameter of said recesses is about 2.5–3 times a diameter of said stops.

6. The arrangement in accordance with claim 2, wherein said stops comprise heads of bolts which are axially inserted into said ring-shaped carrier.

7. The arrangement in accordance with claim 6, wherein said bolts are arranged to hold said radial lip seal against said carrier.

8. The arrangement in accordance with claim 6, further comprising a circular support disk supporting said radial lip seal and which is fixedly coupled to said carrier via said bolts.

9. The arrangement in accordance with claim 2, wherein said anti-twisting device comprises an anti-twisting ring disk which includes said recesses, said anti-twisting ring disk being located concentrically within said ring groove.

10. The arrangement in accordance with claim 9, wherein said anti-twisting device further comprises a circular covering disk arranged to coupled said anti-twisting ring disk to said second component via axial screws.

11. The arrangement in accordance with claim 1, wherein a radial lip of said radial lip seal is loaded by a spring in a direction of said circumferential surface.

12. The arrangement in accordance with claim 11, wherein said spring comprises a circular plate spring having a U-shaped cross section.

13. The arrangement in accordance with claim 1, wherein one of said first and said second component has a rotationally fixed axis and the other of said first and said second component supports a jacket of a sagging compensation roll.

14. The arrangement in accordance with claim 13, wherein said sagging compensation roll is hydraulically supported on said other component.

15. An apparatus for providing a seal between relatively rotatable components, comprising:
   a first component comprising a cylindrical circumferential surface on one of an interior and exterior circumference; and
   a second component comprising a ring groove open toward said circumferential surface;
   a ring-shaped carrier being arranged to be displaceable in said ring groove;
   a radial lip seal being arranged to rest against said circumferential surface in an elastic manner; and
   an anti-twisting device coupled to said ring-shaped carrier and arranged to enable a limited range of motion in all directions of a radial plane.

16. The apparatus in accordance with claim 15, wherein said anti-twist device is coupled to said ring groove and comprises an anti-twist ring disk having recesses.

17. The apparatus in accordance with claim 16, wherein stop devices are arranged to extend from said ring-shaped carrier and into said recesses.

18. The apparatus in accordance with claim 17, wherein said radial lip seal is coupled to said ring-shaped carrier by bolts, and wherein heads of said bolt form said stop devices.

19. The apparatus in accordance with claim 18, further comprising a supporting ring disk arranged to support said radial lip seal, and located between said radial lip seal and said anti-twist ring disk.

20. The apparatus in accordance with claim 19, wherein said bolt heads extend from said supporting ring disk.

21. The apparatus in accordance with claim 17, wherein said recesses have a greater cross sectional area than said stop devices.

22. The apparatus in accordance with claim 17, further comprising an axial seal arranged between said ring groove and said ring-shaped carrier.

23. The apparatus in accordance with claim 17, further comprising a centering rod arranged to guide said ring-shaped carrier on said circumferential surface.

* * * * *